United States Patent

[11] 3,532,172

[72] Inventor Clarence B. Richey
 Fresno, California
[21] Appl. No. 727,963
[22] Filed May 9, 1968
[45] Patented Oct. 6, 1970
[73] Assignee Massey-Ferguson Inc.
 1901 Bell Avenue, Des Moines, Iowa
 a corporation of Maryland

[54] SEMI-MOUNTED PLOW WITH CASTER WHEEL THAT CAN BE TILTED AND LOCKED FOR PLOWING
 16 Claims, 2 Drawing Figs.
[52] U.S. Cl. ............................................. 172/212, 172/223
[51] Int. Cl. ............................................. A01b 3/28
[50] Field of Search ............................................. 172/212, 223, 227, 291

[56] References Cited
UNITED STATES PATENTS
376,535  1/1888  Lynch ..................... 172/291
1,068,369  7/1913  Shaw ..................... 172/291X
3,319,721  5/1967  Keplinger et al. ............. 172/212
3,357,501  12/1967  Watts ..................... 172/212X FOREIGN PATENTS
214,185  8/1961  Austria ..................... 172/212
1,051,487  1/1954  France ..................... 172/212

Primary Examiner—Robert E. Pulfrey
Assistant Examiner—James W. Peterson
Attorney—Gerhardt, Greenlee and Farris ABSTRACT: A semi-mounted, two-way, turnover plow having a caster wheel supporting the trailing end of the plow. In the operative position of the plows, the caster wheel is locked in a steering position to steer the trailing end of the plow to one side of the longitudinal axis of the tractor as urged by the forces acting on the plow bottoms, and is also tilted to an inclined plane relative to the ground to counteract transverse soil forces acting on the plow bottoms. Movement of the plow bottoms from their working to transport positions releases the caster wheel and permits it to return to its vertical, swiveling position.

Patented Oct. 6, 1970 3,532,172

INVENTOR.
CLARENCE B. RICHEY
BY
Tweedale & Gerhardt
ATTORNEYS.

3,532,172

SEMI-MOUNTED PLOW WITH CASTER WHEEL THAT CAN BE TILTED AND LOCKED FOR PLOWING

BACKGROUND OF THE INVENTION

1. Field of the Invention

This invention relates generally to semi-mounted plows movable between earthworking and transport positions, and is particularly concerned with providing such plows with a wheel for supporting the trailing end that can freely caster in the transport position of the plows, but which is directionally locked and tilted in the plowing position.

2. Description of the Prior Art

My copending U.S. application Ser. No. 653,545, filed July 14, 1967 and entitled, "Semi-Mounted Plow With Rear Caster Wheel" discloses a two-way turnover plow wherein the trailing end of the main draft frame member is supported on a caster wheel. When the plow is actuated to a plowing position such that soil forces tend to move the plow frame to an offset position to one side of the tractor longitudinal axis, a locking member on the plow frame engages a control arm to directionally lock the caster wheel in a position relative to the plow frame to steer the trailing end of the plow frame to such offset position. In the transport position of the plow, the caster wheel is released.

An object of this invention is to provide a semi-mounted plow having its trailing end supported by a caster wheel wherein the caster wheel can be both directionally locked and tilted during plowing, but which lies in a vertical plane and can freely caster during transport.

SUMMARY OF THE INVENTION

In accordance with the present invention, the trailing end of the draft frame member of the plow is supported on a caster wheel which is tilted and locked for plowing. When the plow is actuated to a plowing position such that soil forces tend to move the plow frame to an offset position to one side of the tractor longitudinal axis, a locking member on the plow frame engages a control arm to both directionally lock the caster wheel in a position relative to the plow frame to steer the trailing end of the plow frame to the offset position, and at the same time tilts the wheel to an inclined position to counteract the transverse soil forces. The caster wheel assembly is mounted on a torsion bar extending longitudinally through the draft frame member. In the transport position of the plow the caster wheel is released and returns to its vertical position and freely casters.

The objects, advantages and features of the invention will become apparent from the following description taken in connection with the accompanying drawings in which.

Figures 1, 2:
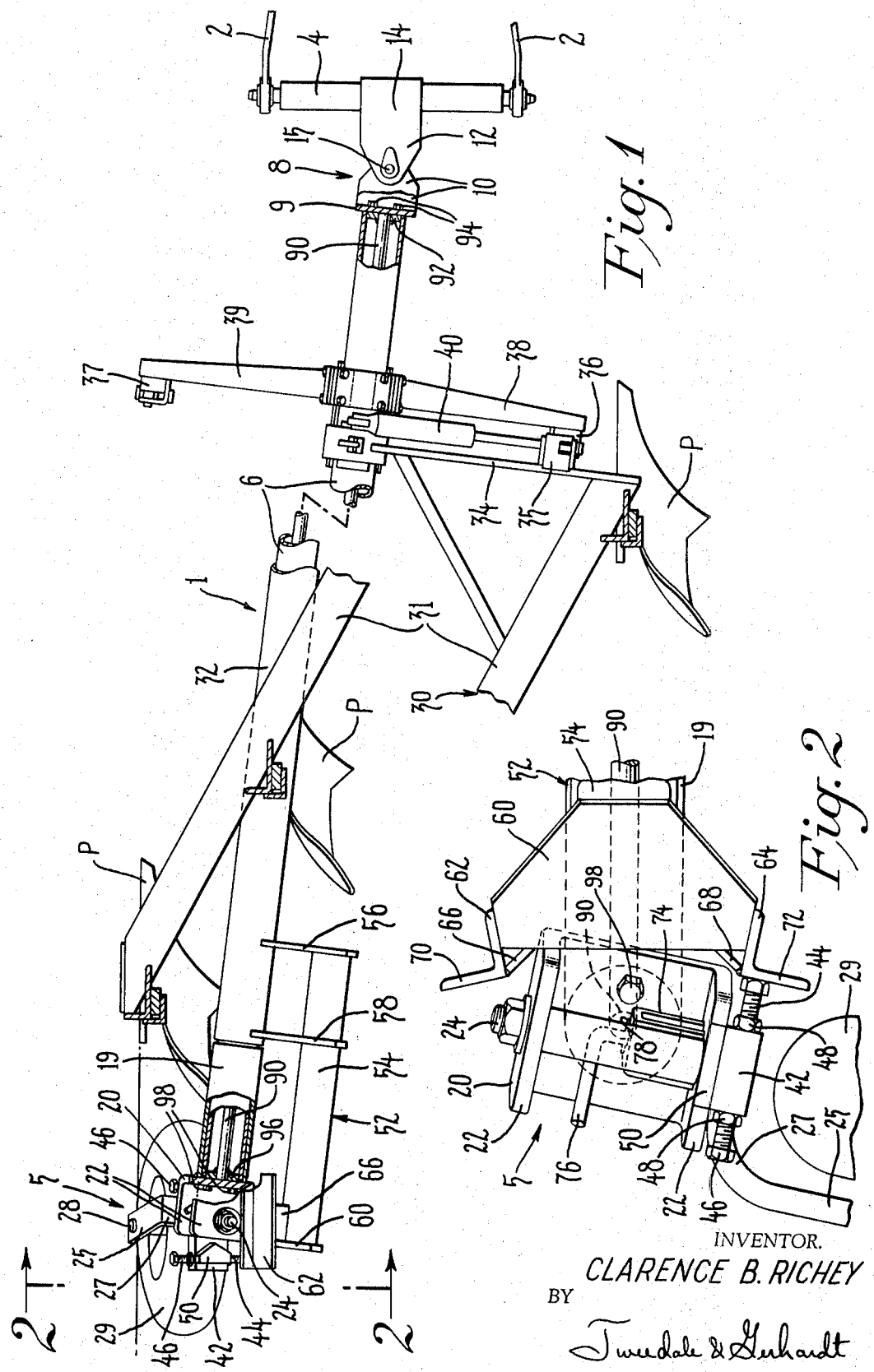
FIG. 1 is a plan view of an implement embodying the invention in its preferred form.
FIG. 2 is a view taken along lines 2–2 of FIG. 1.

With reference to FIG. 1 the implement is designated collectively by reference numeral 1 and is connected at its forward end with a cross bar 4 mounted between the trailing ends of the lower draft links 2 of a conventional three-point hydraulic hitch of a tractor (not shown). The rear end of the implement 1 is supported on a caster wheel assembly 5.

Implement 1 includes a frame comprising an elongated draft frame member 6, preferably of tubular construction, on which is mounted a forward connecting assembly 8 including a C-shaped bracket 9 having vertically spaced arms 10. Arms 10 of bracket 9 are received between the ends of a pair of vertically spaced arms 12 of a frame member 14 mounted on cross bar 4. Arms 10 and 12 are pivotally connected together by a pin or spindle 15 carried by arms 12.

The caster wheel assembly 5 is mounted on a bracket 20 secured to the end of a sleeve 19 rotatably mounted on draft frame member 6. Bracket 20 is formed with vertically spaced, rearwardly projecting arms 22. The shaft 28 of a ground engaging caster wheel 29 is mounted on an arm 25 having an upper horizontal end portion 27 mounted on the frame so as to be rotatable about the axis of a spindle 24. Spindle 24 is mounted between arms 22 of bracket 20.

The plow bottoms P, only the right-hand plow bottoms being visible in the drawings, are supported on a plow frame 30 including a diagonal beam 31 secured intermediate its ends to a frame sleeve 32 which in turn is rotatably mounted on draft frame member 6. The forward end of beam 31 is secured to one end of a transverse frame member 34 which carries a locking member 35. Oppositely projecting arms 38 and 39 carry latching members 36 and 37, respectively, which are alternately engageable by locking member 35. Locking member 35 is actuated by a hydraulic ram 40 which actuates the plow frame to rotate about the axis of draft frame member 6 between its alternate left and right-hand plowing positions and transport position in the manner more fully disclosed in my copending application Ser. No. 531,876, filed March 4, 1966 now U.S. Pat. No. 3,428,135 and entitled, "Turnover Plow", the entire disclosure of which is incorporated herein by reference. Since the turnover mechanism 35, 36, 37, 38, 39, 40, etc., forms no part of the present invention, reference may be had to the latter referred to application for a detailed description of the turnover mechanism shown in the drawings.

Mounted on the upper, horizontal end portion 27 of the wheel support arm 25 is a control arm 42 which rotates with wheel arm 25 about the axis of spindle 24 which may be referred to as the "turning" or "swivel" axis of the caster wheel. Control arm 42 extends on both sides of the axis of spindle 24. Adjustable set screws 44 and 46 are mounted on opposite sides of control arm 42 at the ends thereof and may be locked in position by lock nuts 48.

Mounted on frame sleeve 32 is a bracket 52 including a tubular member 54 connected with sleeve 32 by plates 56 and 58. A support plate 60 is mounted on the rear end of tube 54 and cooperates with plates 66 and 68 welded to tube 54 to support a pair of angle sections 62 and 64. Angle sections 62 and 64 have outwardly projecting flanges 70 and 72, respectively, which, as indicated in the drawing, may be respectively engaged with abutments 44 and 46. A wedge-shaped stop block 50 is mounted on the upper surface of control arm 42 to limit the castering angle of the wheel so that flange 72 can make contact with the adjustable abutments 44, 46 when the plows are rotated to a new operating position and adjust the wheel 29 to a new lead angle relative to the axis of draft frame member 6.

In the position shown in the drawings, the right-hand plow bottoms are in their earthworking position and bracket 52 is positioned to the right of draft frame member 6 such that flange 72 of angle section 64 engages stops 44 and prevents wheel 29 from swiveling around the axis of spindle 24. Moreover, flange 72 is disposed such that with the set screws 44 adjusted as shown in the drawings, wheel 29 is turned at a lead angle relative to the draft frame member 6 such that it steers the trailing end of draft frame member 6 to the left of the tractor longitudinal axis to the position shown in FIG. 1, in which position the plows are urged by the soil forces.

Movement of the plows to their transport position causes rotation of bracket 52 90° in a counterclockwise direction from its FIG. 2 position, in which position the caster wheel assembly 5 would be free to caster about the axis of spindle 24. Upon further rotation of frame sleeve 32 to a position 180° counterclockwise from that shown in the drawings to place the left-hand plow bottoms in their earthworking position, the flange 70 on angle section 62 would engage set screws 46 causing wheel 29 to turn in an opposite direction to an angular position relative to frame 6 to steer the draft frame to the right-hand side of the tractor longitudinal axis.

A U-shaped bracket 74 is mounted on the lower arm 22 of bracket 20 for receiving a latch pin 76 which, when rotated to the position shown in the drawings, disengages a pin 78 from a slot in bracket 74 and prevents pin 76 from projecting through an opening in flange 22 to engage a corresponding opening in control arm 42. When latch pin 76 is rotated clockwise in FIG. 2 to permit pin 78 to engage the slot, control arm 42 can be locked in line with the draft frame member 6 with the plow bottom in transport position for backing and maneuvering the tractor-implement combination.

In order to counteract the side forces on the plow, the wheel assembly 5 is mounted on the draft frame member 6 in such a manner that when the plows are in their operating position, the wheel is tilted to an inclined position so that it counteracts the transverse forces on the plow bottoms. Concentrically mounted within the draft frame member 6 is a torsion bar 90 which is welded at its opposite ends to plates 92 and 96 rotatably received within draft frame member 6. The front end plate 92 is secured to bracket 9 by bolts 94, and the rear end plate 96 is secured to bracket 20 by bolts 98. The position of flanges 70 and 72 relative to the adjustable abutments 44, 46 is such that when the right-hand plow bottoms P are in their plowing position as shown in the drawings, flange 72 causes twisting of torsion bar 90 in a clockwise direction as viewed in FIG. 2 to tilt wheel 29 to an inclined position such that during plowing, it counteracts the transverse soil forces acting on the plow bottoms. When the plows are rotated to transport position, the torsion bar unwinds to cause the wheel to return to its vertical, free castering position, when flanges 70 and 72 are disengaged from the abutments 44, 46.

While a specific form of the invention has been disclosed in the foregoing specification and accompanying drawing, it should be understood that the invention is not limited to the exact construction shown but that other forms will be apparent to those skilled in the art without departing from the scope and spirit of the invention.

I claim:

1. A semi-mounted implement including a frame having forward connecting means for supporting the forward end of the frame on a draft vehicle, tool means mounted on said frame having a ground engaging position in which forces transverse to the direction of movement act on said tool means, a caster wheel supporting the trailing end of the frame, means mounting the caster wheel on the frame permitting the caster wheel to move from a vertical position relative to the ground to an inclined position relative to the ground, and locking means operable in response to movement of the tool means to the ground engaging position to tilt the caster wheel to said inclined position.

2. A semi-mounted implement as claimed in claim 1 in which the forward connecting means connects the frame to the draft vehicle for side to side swinging movement and wherein the transverse forces tend to cause the frame to swing about the forward connecting means to a position relative to the draft vehicle offset to one side of the normal trailing position of the frame, and wherein said locking means is further operable in response to movement of the tool means to the ground engaging position to directionally lock the tilted caster wheel in a position relative to the frame to steer the trailing end of the frame to said offset position.

3. A semi-mounted implement as claimed in claim 1 wherein said means mounting the caster wheel on the frame includes resilient means normally biasing the caster wheel to a vertical position relative to the ground, said locking means being operable to tilt the caster wheel against the biasing force of the resilient means.

4. A semi-mounted implement as claimed in claim 3 wherein said resilient means comprises a torsion bar.

5. A semi-mounted implement as claimed in claim 4 wherein said frame includes an elongated, tubular draft frame member, and said torsion bar is received in the draft frame member.

6. A semi-mounted earthworking implement as claimed in claim 1 wherein said frame comprises an elongated draft frame member; and further including a plow frame rotatably mounted on said draft frame member; and wherein said tool means comprises at least one plow bottom mounted on said plow frame for movement between said earthworking and transport positions upon rotation of said plow frame relative to said draft frame member.

7. A semi-mounted earthworking implement as claimed in claim 6 further including a control arm on said caster wheel assembly; and wherein said locking means engages said control arm to directionally lock the caster wheel assembly upon movement of the plow frame to the earthworking position.

8. A semi-mounted earthworking implement as claimed in claim 7 wherein said control arm is rotatable about the steering axis of the caster wheel assembly, and the steering axis passes through the control arm intermediate its ends; and wherein said locking means includes a flange engageable with the control arm on both sides of the steering axis to directionally lock the caster wheel assembly.

9. A semi-mounted earthworking implement as claimed in claim 8 wherein said locking means includes a bracket mounted on said plow frame for rotation therewith about said draft frame member; and said flange is mounted on said bracket for movement into and out of the path of rotation of the control arm about the steering axis.

10. A semi-mounted earthworking implement as claimed in claim 9 further including adjustable abutments on said control arm engageable by said flange for selectively adjusting the locked direction of the caster wheel assembly.

11. A semi-mounted earthworking implement as claimed in claim 1 wherein said frame comprises an elongated draft frame member; and further including a supporting frame for said tool means which includes a frame sleeve concentrically mounted on said draft frame member for rotation about the longitudinal axis thereof, and a beam secured intermediate its ends to said frame sleeve with its ends projecting on opposite sides of said frame sleeve; and wherein said tool means comprises a plurality of oppositely projecting left and right-hand plow bottoms mounted on said beam along the length thereof for movement upon selective rotation of said frame sleeve with respect to said draft frame member between a right-hand plowing position in which the right-hand plow bottoms only are engageable with the ground, a transport position in which both the right and left-hand plow bottoms project horizontally from said beam, and a left-hand plowing position in which the left-hand plow bottoms only are engageable with the ground.

12. A semi-mounted earthworking implement as claimed in claim 11 wherein said means mounting the caster wheel on the frame comprises a torsion bar having its forward end non-rotatably secured to the forward connecting means and its rear end non-rotatably secured to the caster wheel.

13. A semi-mounted implement as claimed in claim 12 wherein said draft frame member is hollow, and said torsion bar is received within the draft frame member.

14. A semi-mounted implement as claimed in claim 13 wherein said forward connecting means includes a C-shaped bracket, and further including a plate non-rotatably secured to the forward end of the torsion bar; and means non-rotatably securing said plate to said C-shaped bracket.

15. A semi-mounted implement as claimed in claim 14 further including a rear plate non-rotatably secured to the rear end of said torsion bar, said rear plate being rotatably supported within said draft frame member at its trailing end, and means non-rotatably securing said plate to the caster wheel assembly.

16. A semi-mounted implement including a frame having forward connecting means for supporting the forward end of the frame on a draft vehicle, tool means mounted on said frame having a ground engaging position in which forces transverse to the direction of movement act on said tool means, a caster wheel supporting the trailing end of the frame, means mounting the caster wheel on the frame permitting the caster wheel to move from a vertical position relative to the ground to an inclined position relative to the ground, and means operable in response to movement of the tool means to the ground engaging position to tilt the caster wheel to said inclined position and to directionally lock the tilted caster wheel.